United States Patent
Heinicke

(10) Patent No.: US 8,942,969 B2
(45) Date of Patent: Jan. 27, 2015

(54) EVENT SIMULATION WITH ENERGY ANALYSIS

(75) Inventor: Matthias Heinicke, Ditzingen (DE)

(73) Assignee: Siemens Product Lifecycle Management Software Inc., Plano, TX (US)

(*) Notice: Subject to any disclaimer, the term of this patent is extended or adjusted under 35 U.S.C. 154(b) by 598 days.

(21) Appl. No.: 13/183,608

(22) Filed: Jul. 15, 2011

(65) Prior Publication Data

US 2013/0018637 A1    Jan. 17, 2013

(51) Int. Cl.
G06F 17/50 (2006.01)
G06G 7/54 (2006.01)
G06G 7/62 (2006.01)
G06F 11/30 (2006.01)

(52) U.S. Cl.
CPC ........ *G06F 17/5004* (2013.01); *G06F 11/3062* (2013.01); *G06F 17/5009* (2013.01); *Y02T 10/82* (2013.01); *G06F 2217/78* (2013.01)
USPC .................. 703/18; 703/17; 703/19

(58) Field of Classification Search
CPC ............ G06F 17/5004; G06F 11/3062; G06F 2217/78; G06F 17/5009
USPC ................ 703/18, 17, 19
See application file for complete search history.

(56) References Cited

U.S. PATENT DOCUMENTS

| | | | | |
|---|---|---|---|---|
| 7,290,246 | B2* | 10/2007 | Cyran et al. | 717/130 |
| 2007/0013709 | A1* | 1/2007 | Charles et al. | 345/581 |
| 2007/0244604 | A1* | 10/2007 | McNally | 700/291 |
| 2008/0249756 | A1* | 10/2008 | Chaisuparasmikul | 703/13 |
| 2011/0238988 | A1* | 9/2011 | Tanaka et al. | 713/168 |
| 2011/0313578 | A1* | 12/2011 | Jones et al. | 700/291 |
| 2012/0323382 | A1* | 12/2012 | Kamel et al. | 700/286 |

OTHER PUBLICATIONS

Larry O. Degelman, NPL, "Whole building energy performance—simulation and prediction for retrofits", 2001, google.*
Hanns Amri, NPL, "Energy efficient Design and Simulation of a demand controlled heating and ventilation unit in a metro vahicle", 2001.*
Siemens, NPL, "Simulation of the Energy consumption of Conveyor lines", Dec. 14, 2009.*
The MathWorks, NPL, "MATLAB, the language of technical computing", Version 6, Jul. 2002.*

* cited by examiner

*Primary Examiner* — Omar Fernandez Rivas
*Assistant Examiner* — Angel Calle

(57) ABSTRACT

Systems and methods for event simulation with energy analysis. A method includes receiving a plurality of environment objects, and receiving energy attributes corresponding to one or more of the environment objects. The method includes simulating the operation of the environment objects and, during the simulation, calculating values for the energy attributes reflecting the energy use for the respective energy attributes. The method includes displaying the calculated values for the energy attributes.

17 Claims, 4 Drawing Sheets

EVENT SIMULATION WITH ENERGY ANALYSIS

TECHNICAL FIELD

The present disclosure is directed, in general, to computer-aided design, visualization, and manufacturing systems, product lifecycle management ("PLM") systems, and similar systems, that analyze and manage data, for products, systems, and other items (collectively, "Product Data Management" systems or PDM systems).

BACKGROUND OF THE DISCLOSURE

PDM systems manage PLM and other data. Improved systems are desirable.

SUMMARY OF THE DISCLOSURE

Various disclosed embodiments include systems and methods for event simulation with energy analysis. A method includes receiving a plurality of environment objects, and receiving energy attributes corresponding to one or more of the environment objects. The method includes simulating the operation of the environment objects and, during the simulation, calculating values for the energy attributes reflecting the energy use for the respective energy attributes. The method includes displaying the calculated values for the energy attributes.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

Green, sustainable, and energy-saving techniques, practices, and systems are of increasing importance in manufacturing and management tasks. Disclosed embodiments include systems and methods for an energy analyzer for discrete event simulation. The disclosed systems provide an easily understandable analysis of energy factors.

One consideration when designing the layout for new plants, e.g., in the automotive industry, is the "media planning". Media planning includes considering how to place resources in the layout and how to connect the supply for components such as water, gas, pressurized air, and electrical power with the resources. The quantity of needed energy is directly related to the costs for pipelines, cables, fuses, transformers etc. If the energy calculation can be foreseen, including the dynamics such as the high consumption for switching on machines, the transportation media can be more accurately dimensioned and waste can be avoided.

Energy efficiency is expected to be one of the top ten goals for investment decisions in the coming years. Currently there is no tool in the industry to give answers how to plan, dimension, and configure complex dynamic production and logistic systems. Disclosed embodiments include systems and methods for an energy analyzer for discrete event simulation that provides these answers. As production and logistics are the major energy consumers this will have a major impact to identify energy saving potentials to reach energy goals, reduce the carbon footprint and so reduce costs to keep companies competitive.

Figure 1:
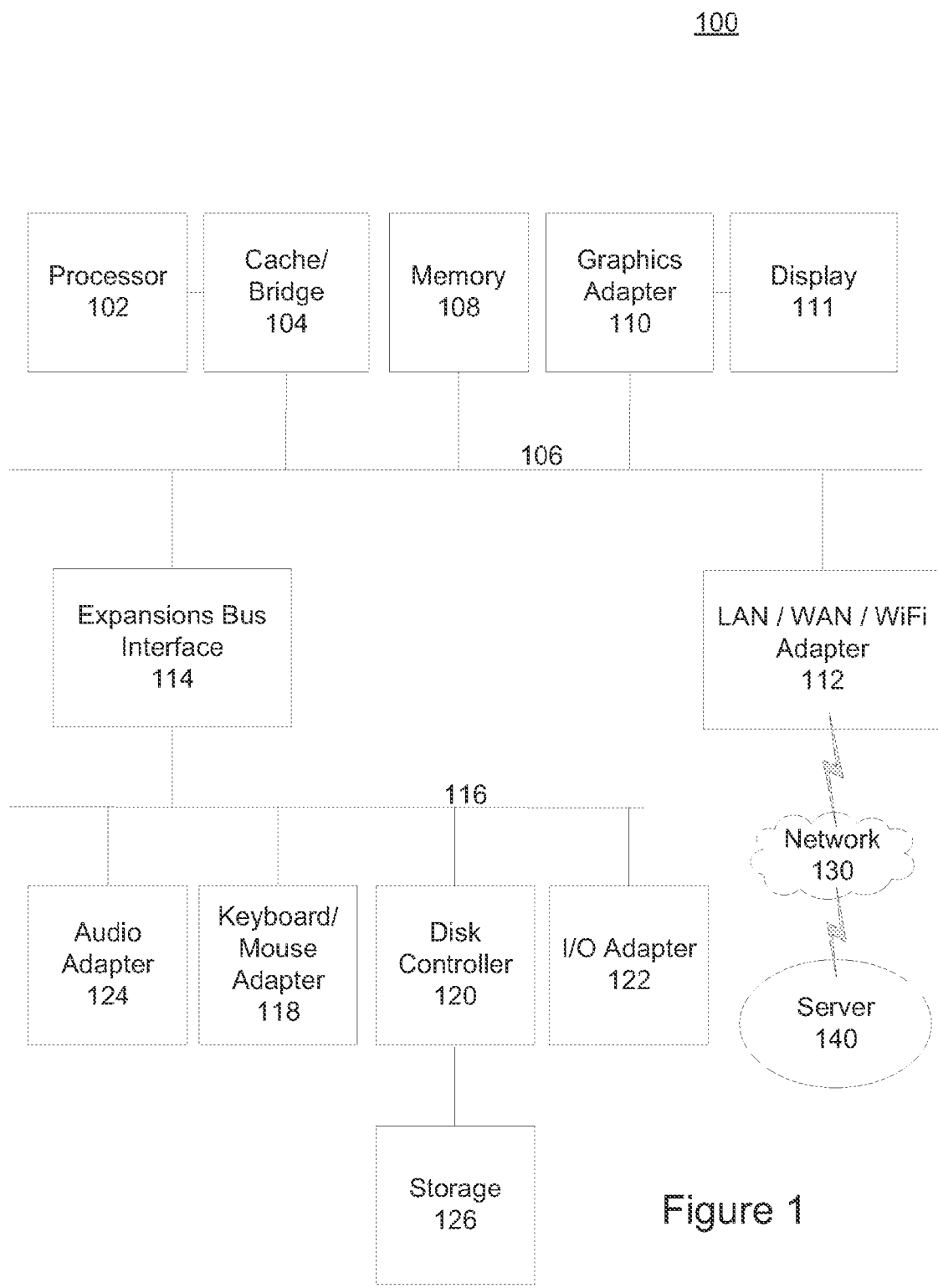
FIG. 1 depicts a block diagram of a data processing system in which an embodiment can be implemented.

FIG. 1 depicts a block diagram of a data processing system in which an embodiment can be implemented, for example as a PDM or other system particularly configured by software or otherwise to perform the processes as described herein, and in particular as each one of a plurality of interconnected and communicating systems as described herein. The data processing system depicted includes a processor 102 connected to a level two cache/bridge 104, which is connected in turn to a local system bus 106. Local system bus 106 may be, for example, a peripheral component interconnect (PCI) architecture bus. Also connected to local system bus in the depicted example are a main memory 108 and a graphics adapter 110. The graphics adapter 110 may be connected to display 111. In some embodiments, display 111 could include 2D and 3D interactive devices. Systems as described herein can also be used, for example, in a large conferences or meetings where the big decisions for large company investments are made, so that the energy values as described herein are easily and intuitively understood.

Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122. Disk controller 120 can be connected to a storage 126, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, etc.

Those of ordinary skill in the art will appreciate that the hardware depicted in FIG. 1 may vary for particular implementations. For example, other peripheral devices, such as an optical disk drive and the like, also may be used in addition or in place of the hardware depicted. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash., may be employed if suitably modified. The operating system is modified or created in accordance with the present disclosure as described.

LAN/WAN/Wireless adapter 112 can be connected to a network 130 (not a part of data processing system 100), which can be any public or private data processing system network or combination of networks, as known to those of skill in the art, including the Internet. Data, processing system 100 can communicate over network 130 with server system 140, which is also not part of data processing system 100, but can be implemented, for example, as a separate data processing system 100.

Various embodiments disclosed herein include an energy analyzer for discrete event simulation that analyzes energy attributes per resource and visualizes them graphically. In some embodiments, the visualization can be displayed in the background on a separate "energy analysis" layer.

Current discrete event simulation tools do not and cannot perform energy analysis. Specific code examples below are shown using Siemens Industry Software Tecnomatix Plant Simulation product using the Siemens "Simtalk" programming capability. Of course, the techniques described herein are not limited to these examples, and can be introduced in any discrete event simulation tool with the capability of free programming and energy specific-attributes.

The specific exemplary implementation below uses an approach with three major steps, each of which can include sub-processes. In the first step, energy specific attributes are defined in for each environment object using customized energy attributes. The calculation of the energy consumption is based on the working time of every part for the environment object and the relative energy consumption per variant over time. The environment object can represent a process, machine, device, or other energy-consuming resource in the simulation environment.

Various embodiments also address a limitation of standard software tools that cannot address unproductive times, since discrete event simulation tools typically do not analyze any unproductive times. Various embodiments also consider non-productive states of various components, such as "paused", "failed", "setup" and "standby", using a "generator element," and calculate the energy consumption in a table based on the predetermined values set for setup, standby, pause, or other such non-productive statuses. The generator element, in certain embodiments, can be adjusted in its time intervals to find the problem-optimal solution between performance and accuracy. Other embodiments do not use a generator element to collect the energy specific data. For example, in one alternative, the environment objects can directly collect their energy specific data and send them to a central analyzing unit or module. The system supports both active sending and collecting of the energy specific data.

Also as part of the first major step, the environment objects or other resources to be analyzed can be identified or received by the system, such as by loading an environment description file, receiving via an interaction with a user, or otherwise. This step can include receiving energy attributes to for one or more of the environment objects to be used as described in the second major step. This step can alternately or additionally include receiving user-defined attributes for one or more of the environment attributes, as described below.

The second major step can be performed during the simulation run as the major analyzing element. A first loop is performed over all the environment objects to collect their energy attributes. Then, the analysis is run to calculate values such as the minimum, maximum, median and average energy values.

An example of a portion of one implementation for checking and setting attribute values is as follows:

```
for i := 1 to o.NumChildren loop          ** find all children of the
                                             desired class
    obj:=o.ChildNo(i);
    print o.ChildNo(i)," ",
    obj.getattribute(attribute);
    value:= obj.getattribute(attribute);  ** gather the new attribute
    energy_Tab[1,i]:=obj.name;
    energy_Tab[2,i]:=value;
    if value<v_min then v_min:=value;     ** find the minimum value
    end;
    if value>v_max then v_max:=value;     ** find the maximum value
    end;
```

```
    v_sum:=v_sum+value;        ** calculate the sum to
                                  calculate the average value
    v_num:=v_num+1;
next:
    v_avg:=v_sum/v_num;        ** calculate the average value
```

This second major step can use a transfer code that transforms the statistical data into graphically usable color or other codes for display as energy consumption indicators.

An example of a portion of one implementation for identifying and placing environment objects or other resources is as follows:

```
for i := 1 to o.NumChildren loop   ** find all children of the desired class
    - print o.ChildNo(i)," ", o.nummu ;
    obj:=o.ChildNo(i);
    x_pos:=obj.xpos;           ** find the position of the resource in
                                  the layout
```

Figure 2:
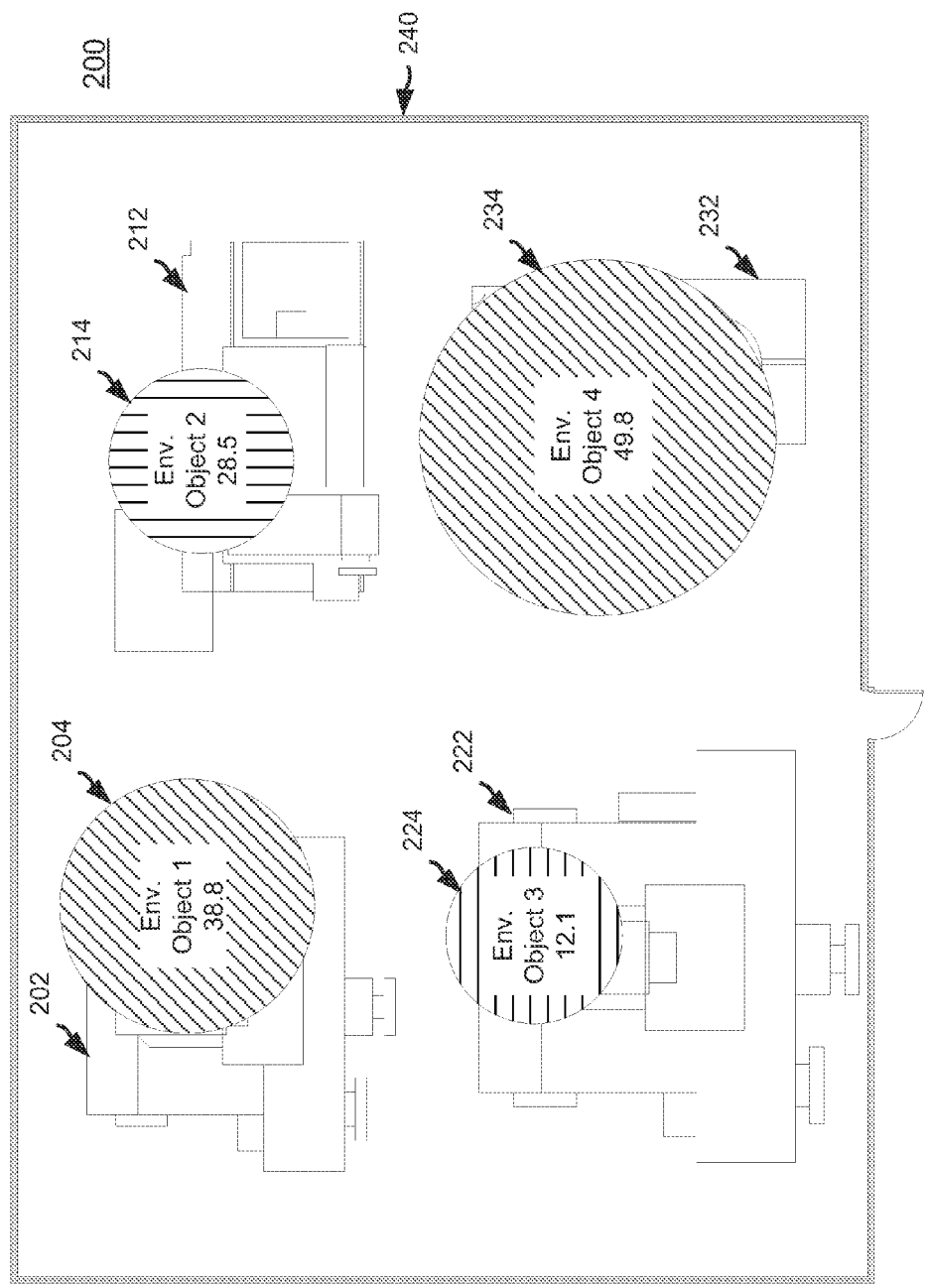
FIG. 2 depicts an example of a system display showing energy use in accordance with disclosed embodiments.

FIG. 2 depicts an example of a system display 200 showing energy use in accordance with disclosed embodiments.

This figure shows a simplified floorplan 240 for a simulation environment display. In the simulation environment, environment objects 204, 214, 224, and 234 are shown in the background; these objects can represent any process, machine, or other energy-consuming resource in the simulation environment. These environment objects can be displayed as a first layer of the simulation environment display, and can be animated or otherwise used to simulate the processes illustrated, using techniques familiar to those of skill in the art.

In some embodiments, energy consumption indicators 202, 212, 222, and 232, each corresponding to one of the environment objects, overlay the environment objects. The energy consumption indicators can be displayed as a second layer of the simulation environment display, and can be opaque (as illustrated) or can be partially transparent to allow the environment objects to be seen.

In various embodiments, the graphical analysis, including the energy consumption indicators, can be shown on top of or behind the environment objects. For example, in-plant simulation objects with a positive layer can be shown on top of the resources, while objects with a negative layer can be shown behind the resources. In cases where the energy consumption indicators visualized behind or beneath the environment objects, the system can first analyze the size of the objects and so define the minimum circle size of the analyzer to be slightly bigger than the size of the biggest environment object, so that it cannot be hidden.

The size of the energy consumption indicators can be used to indicate the relative values associated with each energy consumption indicator. For example, the energy consumption indicator 234 for environment object 4, which is at level 49.8, is much larger than the energy consumption indicator 224 for environment object 3, which is at level 12.1 (though these figures are not to scale).

Additionally or alternately, the energy consumption indicators can be color coded as described above to indicate relative values. In place of color, these figures use patterns to distinguish between various energy consumption indicators. For example, the diagonal striping of energy consumption indicators 204 and 234 indicate relatively high values. The horizontal striping of energy consumption indicator 224 indicates a relatively low value.

Note that each energy consumption indicator can also include a label indicating the environment object with which it is associated, as well as the actual value associated with it. The system can receive a user selection of a value to display for each energy consumption indicator; these values can include minimum, maximum, median and average energy values for each environment object, among others.

As the simulation is run, the system can update the energy consumption indicators correspondingly to reflect the correct corresponding values at each point in the simulation, as the third major step.

Figure 3:
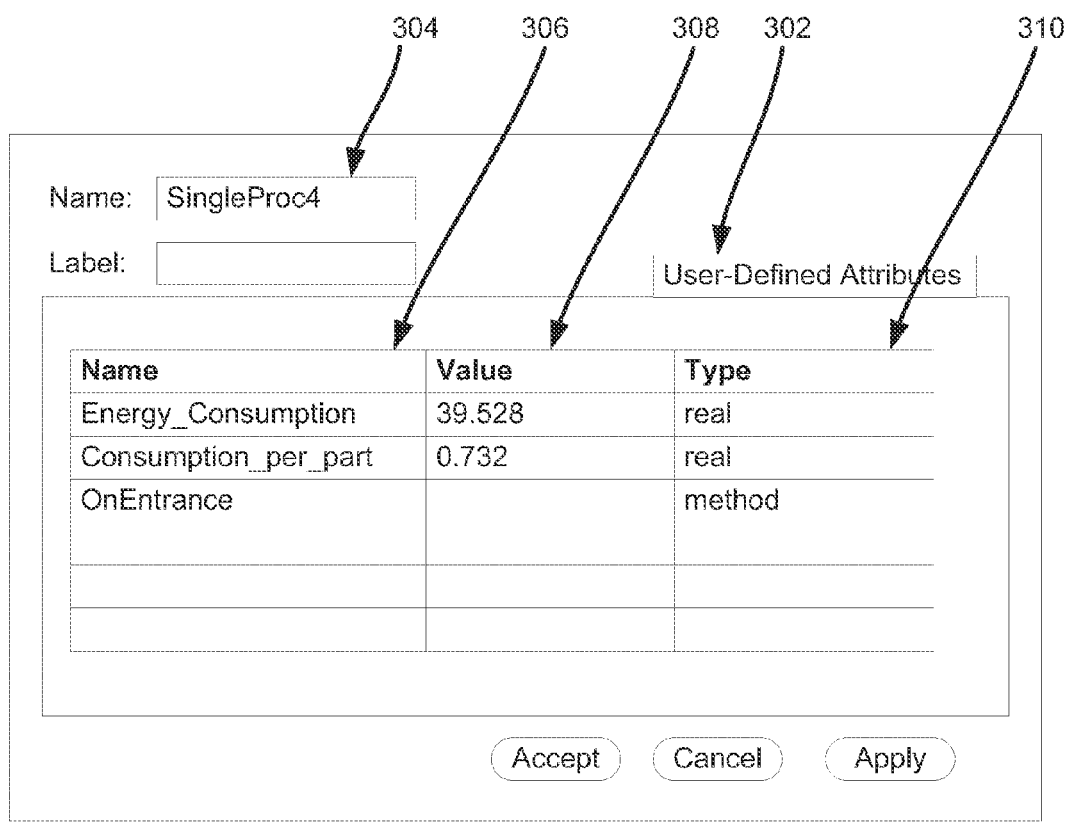
FIG. 3 depicts an example of an interface to 300 define attributes for an environment object such as a process or machine, in accordance with disclosed embodiments.

FIG. 3 depicts an example of an interface to 300 define attributes for an environment object, such as a process or machine.

This interface 300 allows the system to receive user-defined attributes 302 via an interaction with a user. The user can name the environment object in area 304, and then can fill in other aspects for each attribute. Each attribute can include a name 306, a value 308, a type 310, and other information. In this example, the environment object "SingleProc4" has an Energy Consumption value of 39.528 and an energy Consumption_per_part value of 0.732. Of course, various embodiments can support an unlimited number of different attributes as may be useful for particular implementations. For example, other attributes could include the energy for standby, energy consumption when loading or starting, or even a formula to calculate the energy consumption when utilized under certain conditions, such as at 87.5% of capacity or loaded with a part weighing 4.3 kg.

Figure 4:
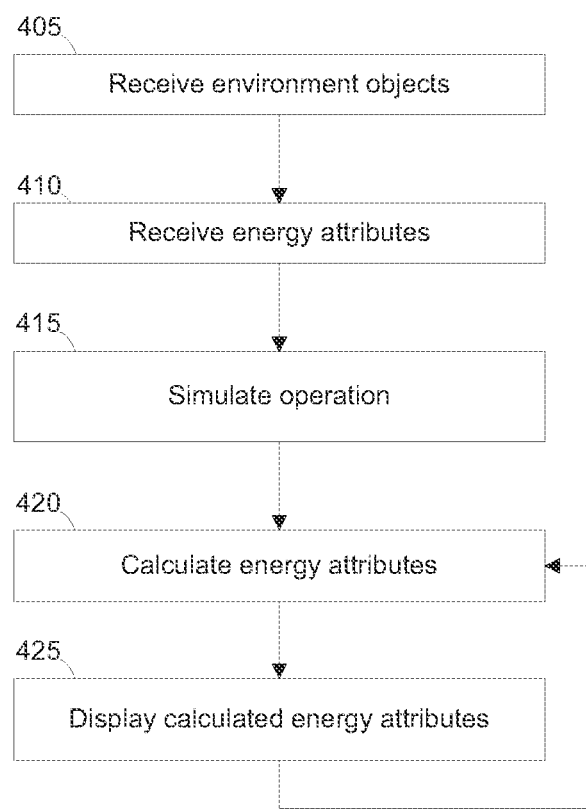
FIG. 4 depicts a flowchart of a process in accordance with disclosed embodiments.

FIG. 4 depicts a flowchart of a process in accordance with disclosed embodiments that may be performed, for example, by a data processing system configured for discrete environment simulation with energy analysis.

The system receives environment objects to be simulated (step 405).

The system receives energy attributes for one or more of the environment objects to be simulated (step 410).

The system simulates the operation of the environment objects (step 415). This can be by loading an environment description file, receiving via an interaction with a user, or otherwise.

During the simulation, the system collects and calculates values for the energy attributes for the one or more environment objects (step 420). The values reflect the energy use or consumption for each of the respective energy attributes.

The system displays the calculated energy attributes for the one or more environment objects (step 425). This step can include displaying the simulation of the operation for the environment objects. In some cases the simulation can be displayed on a first graphical layer and the calculated energy attribute values can be displayed on a second graphical layer that overlies the first graphical layer. Each of the energy attribute values can be displayed in a location associated with the corresponding environment object, particularly, when the simulation is also displayed.

The calculated energy attributes can be displayed using color coding, relative sizing, or other graphical differences according to the absolute or relative values of each respective energy attribute.

The system can continue to update the energy attributes as the simulation is performed (returning to step 420) until the simulation is complete or stopped by a user or otherwise. In this way, the displayed values are dynamically updated during the simulation. At the end of the simulation, or when the simulation is paused, the indicators can be displayed statically at their last calculated values.

Of course, those of skill in the art will recognize that, unless specifically indicated or required by the sequence of operations, certain steps in the processes described above may be omitted, performed concurrently or sequentially, or performed in a different order.

Those skilled in the art will recognize that, for simplicity and clarity, the fill structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 100 may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs). Various embodiments can include transitory or non-transitory computer-readable media unless otherwise specified.

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC §112 unless the exact words "means for" are followed by a participle.

What is claimed is:

1. A method for energy analysis, the method performed by a data processing system and comprising:
   receiving a plurality of environment objects;
   receiving energy attributes corresponding to one or more of the environment objects;
   simulating the operation of the environment objects, including simulation of a non-productive state of at least one of the environment objects;
   during the simulation, calculating values for the energy attributes reflecting the energy use for the respective energy attributes, including values for energy attributes of the at least one of the environment objects in the non-productive state; and
   displaying the calculated values for the energy attributes, wherein the calculating and displaying acts are repeated while the simulation continues to dynamically update the displayed calculated values.

2. The method of claim 1, wherein the displaying includes displaying the simulation.

3. The method of claim 2, wherein the simulation is displayed on a first graphical layer and the calculated values are displayed on a second graphical layer that overlies the first graphical layer.

4. The method of claim 1, wherein each of the calculated values is displayed in a location associated with the corresponding environment object.

5. The method of claim 1, wherein the calculated values are displayed using color coding according to the relative values of each respective energy attribute.

6. The method of claim 1, wherein the energy attributes are user-defined and received via an interaction with a user.

7. A data processing system comprising:
   a processor; and
   an accessible memory, the data processing system particularly configured to
      receive a plurality of environment objects;
      receive energy attributes corresponding to one or more of the environment objects;
      simulate the operation of the environment objects, including simulation of a non-productive state of at least one of the environment objects;
      during the simulation, calculate values for the energy attributes reflecting the energy use for the respective energy attributes, including values for energy attributes of the at least one of the environment objects in the non-productive state; and
      display the calculated values for the energy attributes, wherein the calculating and displaying acts are repeated while the simulation continues to dynamically update the displayed calculated values.

8. The data processing system of claim 7, wherein the displaying includes displaying the simulation.

9. The data processing system of claim 8, wherein the simulation is displayed on a first graphical layer and the calculated values are displayed on a second graphical layer that overlies the first graphical layer.

10. The data processing system of claim 7, wherein each of the calculated values is displayed in a location associated with the corresponding environment object.

11. The data processing system of claim 7, wherein the calculated values are displayed using color coding according to the relative values of each respective energy attribute.

12. The data processing system of claim 7, wherein the energy attributes are user-defined and received via an interaction with a user.

13. A non-transitory computer-readable medium encoded with executable instructions that, when executed, cause one or more data processing systems to:
   receive a plurality of environment objects;
   receive energy attributes corresponding to one or more of the environment objects;
   simulate the operation of the environment objects, including simulation of a non-productive state of at least one of the environment objects;
   during the simulation, calculate values for the energy attributes reflecting the energy use for the respective energy attributes, including values for energy attributes of the at least one of the environment objects in the non-productive state; and
   display the calculated values for the energy attributes, wherein the calculating and displaying acts are repeated while the simulation continues to dynamically update the displayed calculated values.

14. The computer-readable medium of claim 13, wherein the displaying includes displaying the simulation.

15. The computer-readable medium of claim 14, wherein the simulation is displayed on a first graphical layer and the calculated values are displayed on a second graphical layer that overlies the first graphical layer.

16. The computer-readable medium of claim 13, wherein each of the calculated values is displayed in a location associated with the corresponding environment object.

17. The computer-readable medium of claim 13, wherein the calculated values are displayed using color coding according to the relative values of each respective energy attribute.

* * * * *